(12) United States Patent
Farzaneh et al.

(10) Patent No.: US 10,345,828 B2
(45) Date of Patent: Jul. 9, 2019

(54) HYDRAULIC MANIFOLD CHANNEL PLUG

(71) Applicant: Continental Automotive Systems, Inc., Auburn Hills, MI (US)

(72) Inventors: Nader Farzaneh, Wheeling, IL (US); Zito J. Donald, Fox River Grove, IL (US)

(73) Assignee: Continental Powertrain, USA, Auburn Hills, MI (US)

( * ) Notice: Subject to any disclaimer, the term of this patent is extended or adjusted under 35 U.S.C. 154(b) by 0 days.

(21) Appl. No.: 15/615,224

(22) Filed: Jun. 6, 2017

(65) Prior Publication Data

US 2018/0348799 A1  Dec. 6, 2018

(51) Int. Cl.
| | |
|---|---|
| *F16L 55/10* | (2006.01) |
| *G05D 16/02* | (2006.01) |
| *F15B 13/08* | (2006.01) |
| *F16L 55/128* | (2006.01) |
| *F16L 55/11* | (2006.01) |
| *F16L 55/124* | (2006.01) |

(52) U.S. Cl.
CPC ......... *G05D 16/02* (2013.01); *F15B 13/0828* (2013.01); *F15B 13/0871* (2013.01); *F16L 55/11* (2013.01); *F16L 55/124* (2013.01); *F16L 55/128* (2013.01)

(58) Field of Classification Search
CPC ......... F16L 55/11; F16L 55/1141; F28F 11/02
USPC ..................................................... 138/94, 89
See application file for complete search history.

(56) References Cited

U.S. PATENT DOCUMENTS

| | | | | |
|---|---|---|---|---|
| 1,137,344 A | * | 4/1915 | McKenzie | F16L 55/124 138/94 |
| 2,812,778 A | * | 11/1957 | Ver Nooy | F16L 55/105 138/94 |
| 5,318,074 A | * | 6/1994 | Sivacoe | F16L 55/1125 138/89 |
| 5,944,057 A | * | 8/1999 | Pierce | F28F 11/02 138/89 |

FOREIGN PATENT DOCUMENTS

| | | |
|---|---|---|
| EP | 0716913 B1 | 6/1998 |
| EP | 0875355 | 11/1998 |

\* cited by examiner

*Primary Examiner* — Patrick F. Brinson (57) ABSTRACT

A hydraulic manifold plug includes a plug body defining a longitudinal axis and a transverse axis. The manifold includes at least one receiving hole configured to releasably receive at least one positioning key associated with a manifold press. The plug body includes an opening defined by the plug body. The opening is at an angle with respect to the longitudinal axis. The plug body also includes an inner surface defined by the opening and having a concave shape. The plug body is configured to be positioned in a manifold port extending along the longitudinal axis by way of the at least one receiving hole receiving the at least one positioning key. The one positioning key aligns the plug body such that the transverse axis is substantially parallel to a lateral axis defined by a channel of the manifold that forms an angle with the manifold port.

20 Claims, 6 Drawing Sheets

HYDRAULIC MANIFOLD CHANNEL PLUG

TECHNICAL FIELD

This disclosure relates to a hydraulic manifold channel plug.

BACKGROUND

A hydraulic manifold is a component having a wide and/or big pipe, or channel, into which smaller pipes or channels lead. The hydraulic manifold regulates fluid flow between pumps and actuators and other components in a hydraulic system. In other words, a hydraulic manifold controls the transfer of power between actuators and pumps by regulating the fluid flow in the hydraulic system. Hydraulic manifolds have several applications that include, but are not limited to, machine tools, production and material handling equipment, food processing, marine, off-highway equipment, heavy construction equipment, oil field and farm equipment, and valve operations, and automatic transmissions for vehicle (e.g., cars, trucks, motorcycles, buses).

Figure 1:
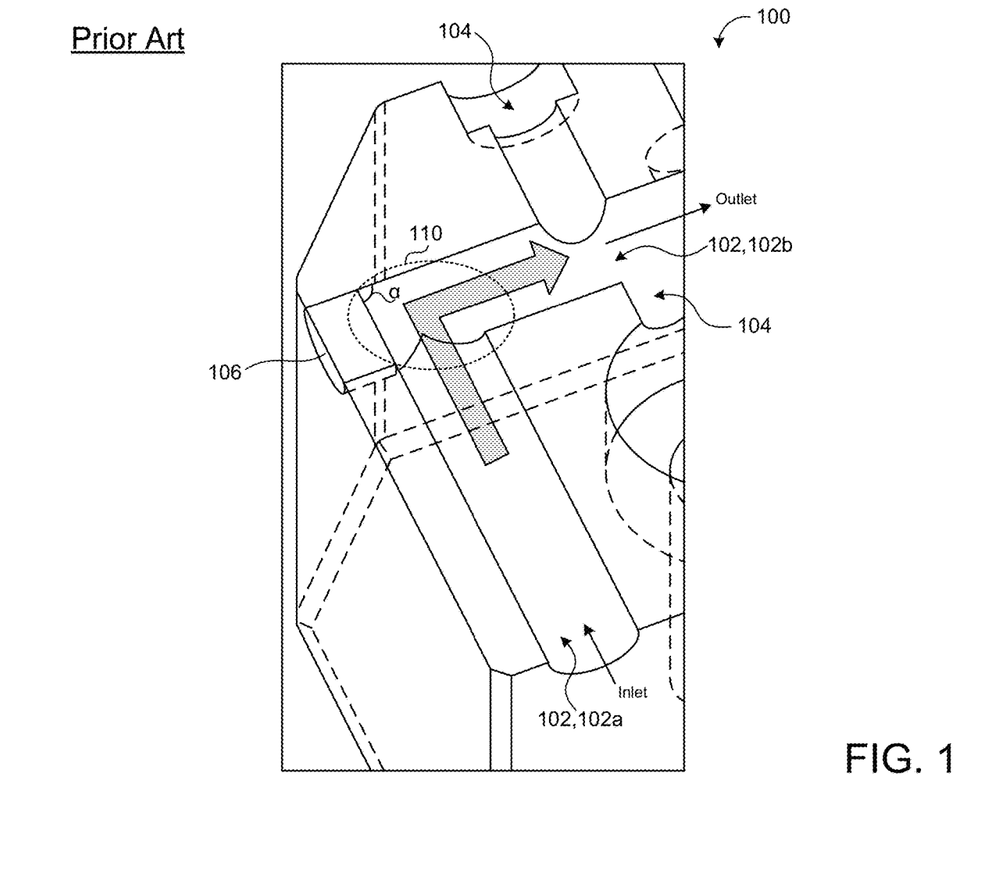
FIG. 1 is a schematic view of a prior art hydraulic manifold.
Figure 2:
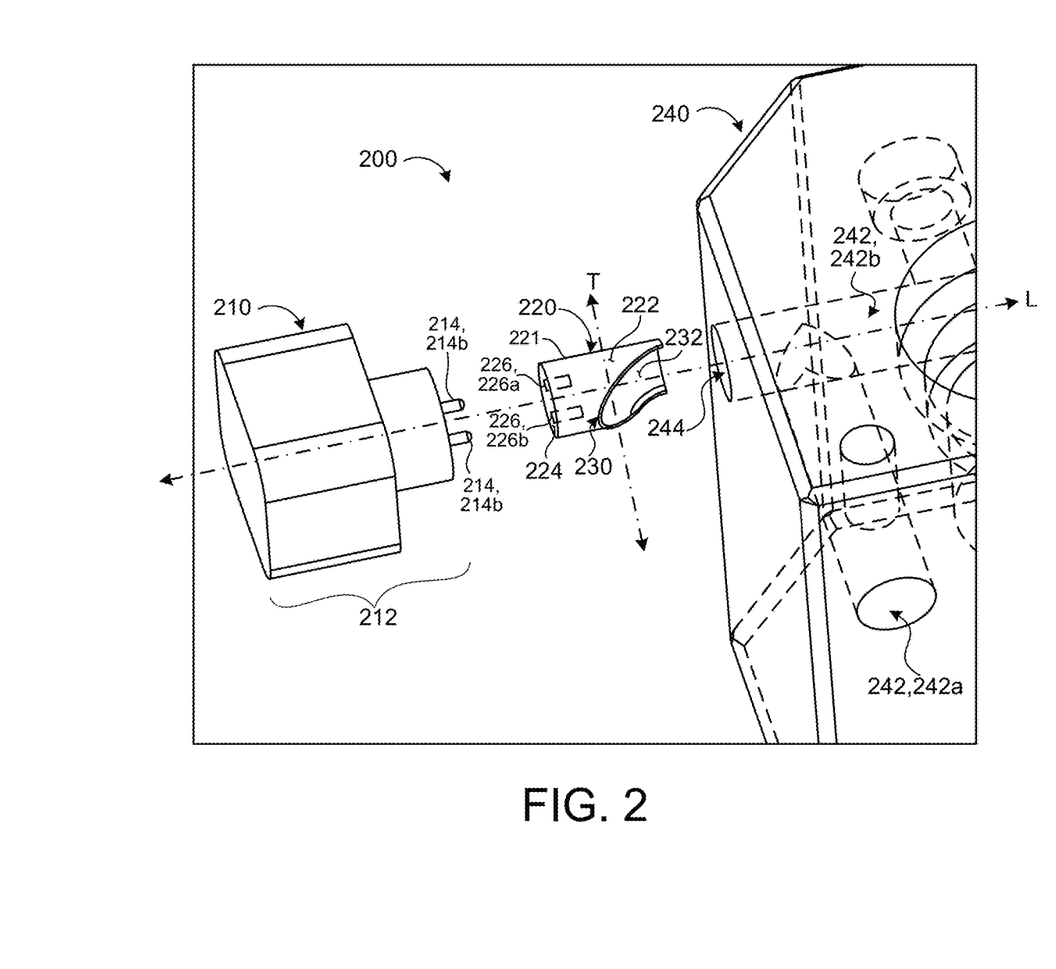
FIG. 2 is an exploded view of an exemplary hydraulic manifold with a press fixture and a contoured plug.

Referring to FIG. 1, generally, a hydraulic machined manifold 100 includes a main pipe 102 that allows the flow of fluid. The main pipe 102 includes a first channel portion 102a and a second channel portion 102b positioned at an angle with respect to the first channel portion 102a. The first and second channel portion 102a, 102b of the main pipe 102 meet at an elbow 110 of the main pipe 102. The main pipe 102 may be in fluid communication with one or more smaller pipes 104. The main pipe 102 and the smaller pipes 104 regulate fluid flow between pumps and actuators and other components in the hydraulic manifold 100. In some examples, the elbow 110 where the first and second channel portions 102a, 102b intersect includes a plug 106 to prevent the fluid flowing through the main pipe 102 to flow outside the machined manifold 100. In some examples, the machined manifold 100 is plugged in by pressing a cylindrical shaped rod 106, also referred to as a plug, into the one or more machined holes. As shown in the figure, the cylindrical shaped rod 106 is inserted into the machined hole and prevents fluid from flowing outside the manifold. As shown, the plug 106 allows the main pipe 102 to guide the fluid through the first and second channel portions 102a, 102b respectively. A bending angle α of the elbow bend 110 may be 90 degrees. Therefore, the sharp corner of the elbow 110 results in fluid flow turbulence and pressure loss of the flowing fluid from an inlet of the main pipe 102 to an outlet. Therefore, there is a need to improve the design and performance of machined hydraulic manifolds to reduce and/or eliminate fluid flow turbulence and pressure loss of the flowing fluid.

SUMMARY

One aspect of the disclosure provides a hydraulic manifold plug that includes a plug body, at least one receiving hole, an opening, and an inner surface. The plug body defines a longitudinal axis and a transverse axis. The plug body includes a bottom surface. The at least one receiving hole is configured to releasably receive at least one positioning key associated with a manifold press fixed to a bracket. The opening is defined by the plug body and positioned opposite the bottom surface. The opening is at an angle with respect to the longitudinal axis. The inner surface is defined by the opening and has a concave shape. The plug body is configured to be positioned in a manifold port extending along the longitudinal axis by way of the at least one receiving hole receiving the at least one positioning key. The one positioning key aligns the plug body such that the transverse axis of the plug body is substantially parallel to a lateral axis defined by a channel of the manifold that forms an angle with the manifold port.

Implementations of this aspect of the disclosure may include one or more of the following optional features. In some implementations, the bottom surface of the plug body is substantially parallel to the transverse axis. The at least one receiving hole may define a cylindrical shape, a square prism shape, a rectangular prism shape, a pentagonal prism shape, a hexagonal prism shape, an octagonal prism shape. In some examples, the inner surface of the opening has a shape of a partial sphere. In other examples, the inner surface of the opening has a shape of a partial ellipsoid. The longitudinal axis may be perpendicular to the lateral axis. In some examples, the hydraulic manifold moves along the transverse axis with respect to the fixed manifold press fixture.

In some implementations, the hydraulic manifold plug further includes a manifold press fixture that includes a press body extending along the longitudinal axis. The manifold press fixture may include at least one positioning key extending away from a surface of the press body in a direction substantially parallel to the longitudinal axis. In some examples, the manifold press fixture is releasably fixed to a bracket relative to the plug body. The at least one positioning key may include a shape being one of a cylindrical shape, a square prism shape, a rectangular prism shape, a pentagonal prism shape, a hexagonal prism shape, an octagonal prism shape.

Another aspect of the disclosure provides a hydraulic manifold system that includes a manifold press fixtures, a plug, and a hydraulic manifold. The manifold press fixture includes a body defining a longitudinal axis, the manifold press fixture includes at least one positioning key that extends away from a surface of the body in a direction substantially parallel to the longitudinal axis. The plug extends along the longitudinal axis and defines a transverse axis. The plug includes a bottom surface that defines at least one receiving hole configured to releasably receive the at least one positioning key. In addition, the plug includes an opening positioned opposite the bottom surface. The opening is at an angle with respect to the longitudinal axis and defines an inner surface. The hydraulic manifold defines a channel. The channel includes a first channel portion and a second channel portion being at an angle with respect to the first channel portion. The hydraulic manifold also defines a manifold port sized to receive the plug when the at least one positioning key is inserted in the at least one receiving hole.

Implementations of this aspect of the disclosure may include one or more of the following optional features. In some implementations, the manifold press fixture is releasably fixed to a bracket relative to the hydraulic manifold. The at least one positioning key may be a pin having a shape being one of a cylindrical shape, a square prism shape, a rectangular prism shape, a pentagonal prism shape, a hexagonal prism shape, an octagonal prism shape. In some examples, the at least one receiving hole has a shape complimentary to the shape of the at least one positioning key.

In some examples, the inner surface of the opening defines a concave shape. The inner surface of the opening may have a shape of a partial sphere or a shape of a partial ellipsoid. In some implementations, the first and second channel portions of the channel form a 90 degree angle with respect to one another. The hydraulic manifold may move along the transverse axis with respect to the manifold press fixture. In some examples, when the plug is inserted into the manifold, the transverse axis of the plug is substantially parallel to a lateral axis defines by the first channel portion of the main channel.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A hydraulic manifold that improves fluid flow turbulence and improves the pressure drop of the fluid flow through one or more bends of the hydraulic manifold is desirable. Therefore, referring to FIGS. 2-5B, a hydraulic manifold system 200 includes a manifold press fixture 210, a hydraulic manifold plug 220 (also referred to as a plug 220), and a hydraulic manifold 240. The press fixture 210 includes a press fixture body 212. A positioning key 214 is supported by the press fixture body 212 and is configured to position the plug 220 in a manifold port 244 defined by the hydraulic manifold 240. The positioning key 214 may extend away from a surface of the press fixture body 212 in a direction substantially parallel to a longitudinal axis L extending along the press fixture 210. As shown, the positioning key 214 includes two pins 214a, 214b having a cylindrical shape. However, the positioning key 214 may include one or more pins 214a, 214b having other shapes, and in some examples where the positioning key 214 includes more than one pin 214a, 214b, the shape of each one of the pins 214a, 214b may be different with respect to another one of the pin 214a, 214b. For example, the positioning key 214 may include one or more pins having a square prism shape, a rectangular prism shape, a pentagonal prism shape, a hexagonal prism shape, an octagonal prism shape, a combination thereof, or any other shape.

In some examples, the press fixture 210 is fixed or releasably fixed to a bracket 500 relative to the hydraulic manifold 240. As such, the press fixture 210 can accurately position the plug 220 within the manifold port 244 of the hydraulic manifold 240 in an orientation with respect to a main channel 242 of the hydraulic manifold 240, thus improving the fluid flow turbulence and the pressure drop of the flow.

The plug 220 includes a plug body 221 that extends along the longitudinal axis L. The plug body 221 includes an outer surface 222 having a cylindrical shape. In addition, the plug body 221 defines a transverse axis T extending from a first point (not shown) within the outer surface 222 to a second point (not shown) within the outer surface 222, where the first and second points are positioned on a plane that extends along the longitudinal axis L dividing the body 221 in two symmetrical portions.

The plug body 221 includes a bottom surface 224 that defines a receiving hole 226 having a shape complementary to a shape of the positioning key 214. As shown, the plug 220 defines two receiving holes 226 having a shape complementary to a shape of the two pins 214a, 214b of the press fixture 210. Therefore, in some examples, the number of receiving holes 226 is equal to the number of positioning keys 214.

Figure 3:
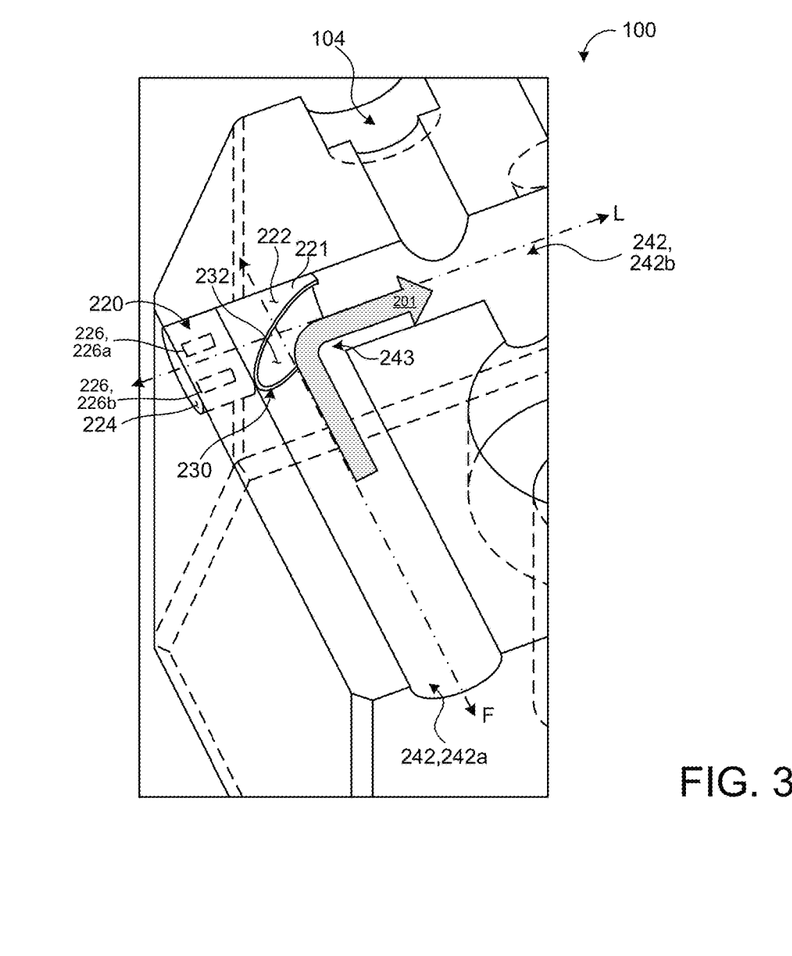
FIG. 3 is a perspective view of an exemplary hydraulic manifold with a contoured plug.
Figure 4A:
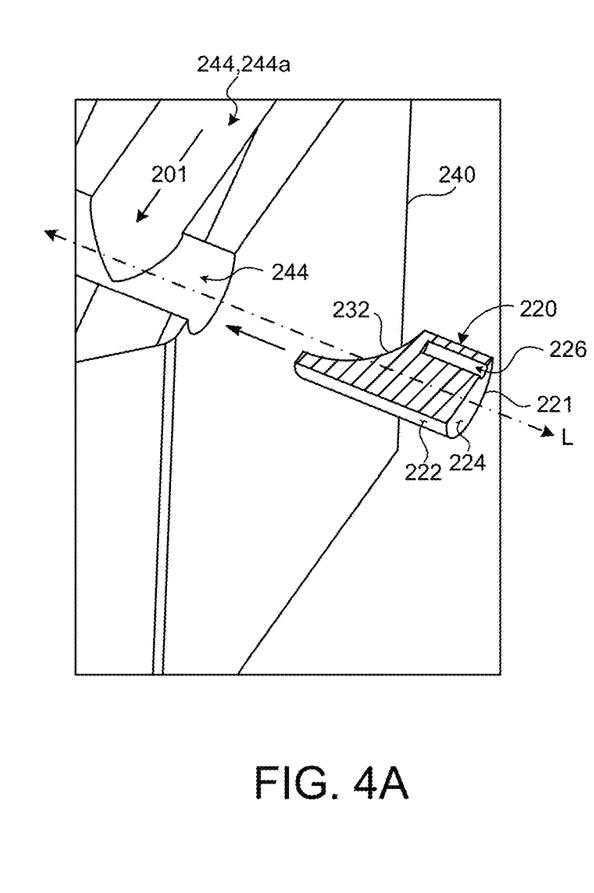
FIG. 4A is an exploded sectional view of an exemplary hydraulic manifold with a contoured plug.
Figure 4B:
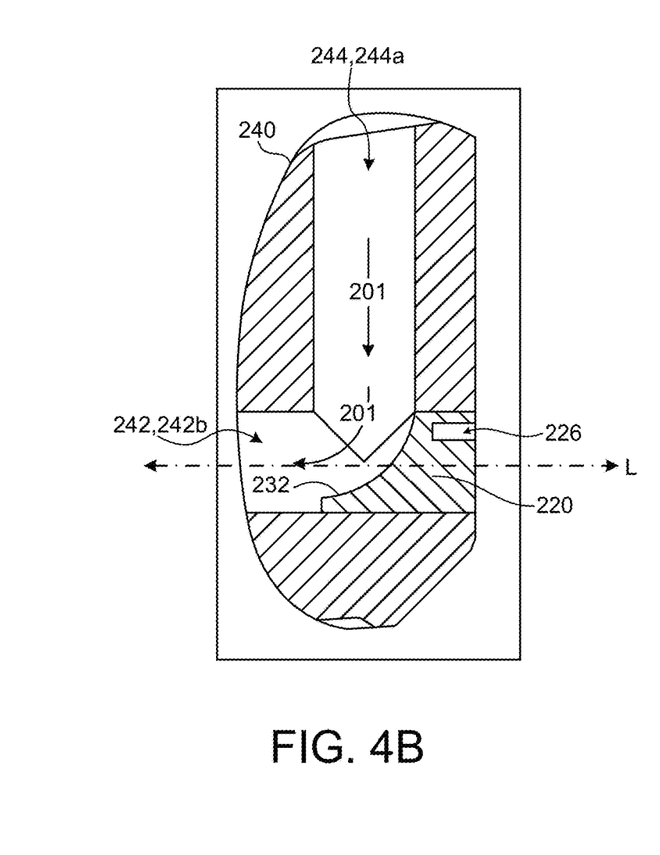
FIG. 4B is a sectional view of the exemplary hydraulic manifold with the inserted contoured plug.
Figure 5A:
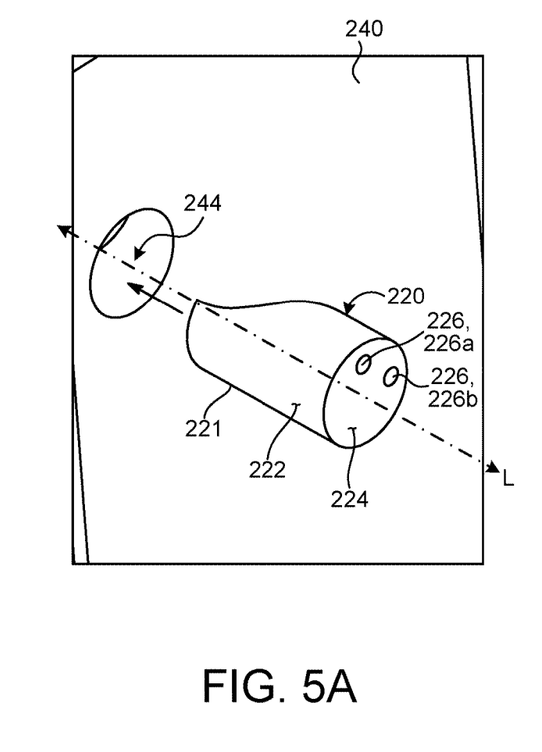
FIG. 5A is an exploded view of an exemplary contoured plug and a manifold port of a hydraulic manifold.
Figure 5B:
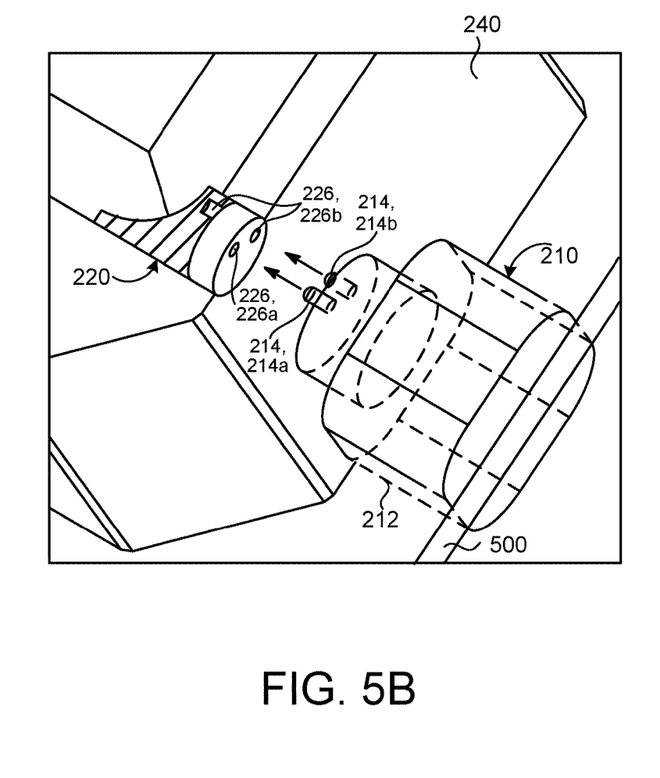
FIG. 5B is an exploded view of an exemplary hydraulic manifold with the inserted contoured plug.

The plug body 221 defines an opening 230 positioned opposite the bottom surface 224 of the plug body 221. The opening 230 is at an angle with respect to the longitudinal axis L and extends from a center portion of the plug body 221 away from the bottom surface 224 of the plug body 221. The opening 230 defines an inner surface 228 having a contoured or concave shape (e.g., a three-dimensional concave shape) to allow fluid to easily flow along the inner surface 228 when the plug 220 is inserted into the manifold 240 (FIGS. 3 and 4B). In some examples, the concave inner surface 228 has a shape of a partial sphere, which is a round geometrical object in three-dimensional space that is the surface of a completely round ball. Therefore, every point associated with the inner surface 228 has the same tangential distance from a given point that forms the center of the sphere. In other examples, the inner surface 228 has a shape of a partial ellipsoid, which is a surface that may be obtained from deforming a sphere by means of directional scalings (e.g., affine transformation). In yet other examples, the concave inner surface 228 has a shape of a partial torus, which is a surface of revolution generated by revolving a circle in three-dimensional space about an axis coplanar with the circle. The concave inner surface 228 may have other shapes as well.

The hydraulic manifold 240 defines a main channel 242 having a first channel portion 244a and a second channel portion 244b where the second channel portion 244b extends along the longitudinal axis L. In some examples, the first channel portion 244a and the second channel portion 244b form a 90 degree angle with respect to one another.

The hydraulic manifold 240 includes a manifold port 244 that extends along the longitudinal axis L. As shown in FIGS. 3 and 4B, the manifold port 244 receives the plug 220 to allow the fluid to flow within the main channel 242 from the first channel portion 242a to the second channel portion 242b while preventing fluid from flowing through the manifold port 244. As such, the manifold port 244 is sized to allow the plug 220 to securely fit within the manifold port 244. In addition, the port 244 has a shape complementary to the outer surface 222 of the plug 220. As shown, both the plug 220 and the manifold port 244 have cylindrical shapes, but other shapes may be possible as well.

The concave shape of the inner surface 228 of the plug 220 improves fluid (e.g., oil) flow through the channel bend 243 (i.e., the portion of the main channel 242 where the first channel portion 242a and the second channel portion 242b intersect). Additionally, the plug 220 improves turbulence, therefore reducing fluctuations that can disrupt the performance of the control valves downstream. Furthermore, the plug 220 improves pressure drop for fluid flow through the channel bend 243, improving efficiency of the hydraulic manifold system 200 and reducing the size of the pump at the inlet of the main channel 242.

Figure 6:
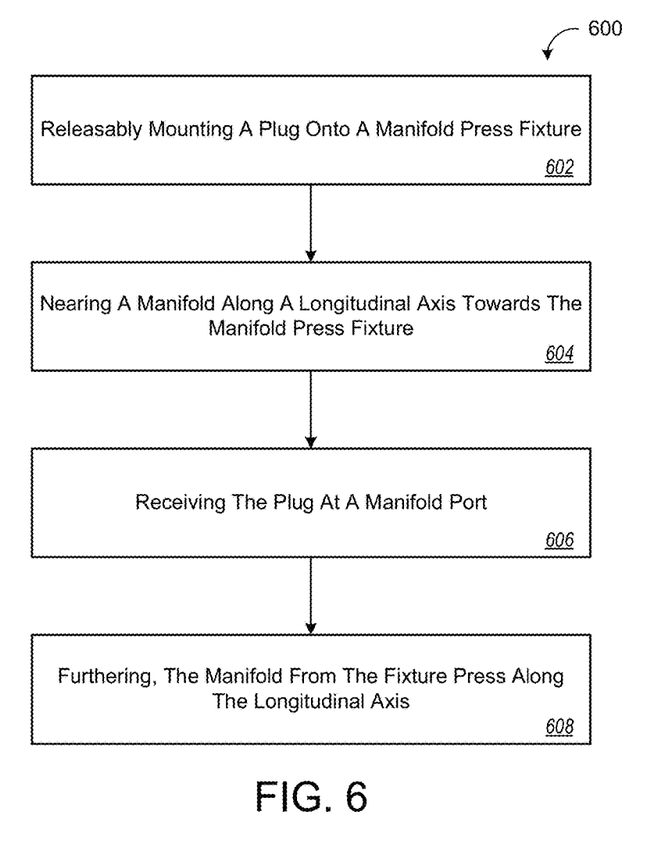
FIG. 6 is a schematic view of an exemplary arrangement of operations for inserting a plug into a manifold port of a manifold using a press fixture.

FIG. 6 provides an example arrangement of operations for a method 600 of inserting a plug 220 into a manifold port 244 of a manifold 240 using a press fixture 210 using the manifold system of FIGS. 2-5B. As previously described, the manifold system 200 includes a manifold press fixture 210, a plug 220, and a manifold 240. The manifold press fixture 210 includes a press fixture body 212 that defines a longitudinal axis L. The manifold press fixture 210 includes at least one positioning key 214 extending away from a surface of a body 212 of the manifold press 210 in a direction substantially parallel to the longitudinal axis L. The plug 220 extends along the longitudinal axis L and defines a transverse axis T. The plug 220 includes a bottom surface 224 that defines at least one receiving hole 226 for receiving the at least one positioning key 214. In addition, the plug 220 includes an opening 230 positioned opposite the bottom surface 224. The opening 230 is at an angle with respect to the longitudinal axis L and/or the transverse axis T. Therefore, at block 602, the method 600 includes mounting the plug 220 onto the manifold press fixture 210 by nearing the plug 220 towards the press fixture 210 along the longitudinal axis L causing the at least one receivable hole 226 to receive the at least one positioning key 214.

The hydraulic manifold 240 defines a main channel 242 having a first channel portion 242a and a second channel portion 242b. In some examples, the first channel portion 242a is positioned at an angle with respect to the second channel portion 242b. The first and second channels 242a, 242b may be perpendicular to one another. The hydraulic manifold 240 defines a manifold port 244 that is sized to receive the plug 220.

At block 604, the method 600 includes nearing the manifold 240 along the longitudinal axis L towards the fixed manifold press fixture 210. The manifold 240 may be positioned in such a way to allow for motion of the manifold 240 along the longitudinal axis L with respect to the fixed press fixture 210. As such, the plug 220 is received by the manifold port 244 in an inserted position determined by the combination of the at least one positioning key 214 and the at least one receiving hole 226.

In some examples, the positioning key 214 (having one or more pins 214a, 214b) of the press fixture 210 is releasably inserted in the receiving hole(s) 226 defined by the bottom surface 224 of the plug 220. Since the orientation of the press fixture 210 is fixed with respect to the hydraulic manifold 240, the press fixture 210 orients the plug 220 in such a way to ensure that the fluid 201 flows within the main channel 242. For example, the press fixture 210 orients the plug 220 in such a way that the transverse axis T of the plug 220 is substantially parallel to the lateral axis F defined by the first channel portion 242a of the main channel 242.

At block 606, once the manifold 240 approaches the plug 220 that is mounted on the press fixture 210, the manifold 240 continues to near the plug 220 until manifold port 244 receives the plug 220 and the plug 220 is inserted in the manifold port 244. Once the plug 220 is inserted in the manifold port 244, at block 608, the manifold 240 is furthered away from the press fixture 210 while the plug 220 remains inserted in the manifold port 244.

After the plug 220 is inserted into the manifold port 244, the plug 220, and due to the shape of the inner surface 232 of its opening 230, allows for fluid 201 to flow through the channel 242 of the manifold 240 and causes the reduction in inlet fluid pressure, turbulence and flow stagnation at the channel bend 243.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A hydraulic manifold plug comprising:
   a plug body defining a longitudinal axis and a transverse axis, the plug body comprising a bottom surface;
   at least one receiving hole configured to releasably receive at least one positioning key associated with a manifold press fixed to a bracket;
   an opening defined by the plug body and positioned opposite the bottom surface, the opening being at an angle with respect to the longitudinal axis; and
   an inner surface defined by the opening, the inner surface having a concave shape,
   wherein during assembly the plug body is configured to be inserted in a manifold port along the longitudinal axis without rotation, the manifold port extending along the longitudinal axis by way of the at least one receiving hole receiving the at least one positioning key, the one positioning key aligns the plug body such that the transverse axis is substantially parallel to a lateral axis defined by a channel of the manifold that forms an angle with the manifold port, and
   wherein after assembly, the one positioning key is released from the at least one receiving hole.

2. The hydraulic manifold plug of claim 1, wherein the bottom surface of the plug body is substantially parallel to the transverse axis.

3. The hydraulic manifold plug of claim 1, wherein the at least one receiving hole defines one of a cylindrical shape, a square prism shape, a rectangular prism shape, a pentagonal prism shape, a hexagonal prism shape, and an octagonal prism shape.

4. The hydraulic manifold plug of claim 1, wherein the inner surface of the opening has a shape of a partial sphere.

5. The hydraulic manifold plug of claim 1, wherein the inner surface of the opening has a shape of a partial ellipsoid.

6. The hydraulic manifold plug of claim 1, wherein the longitudinal axis is perpendicular to the lateral axis.

7. The hydraulic manifold plug of claim 1, wherein the hydraulic manifold plug moves along the longitudinal axis with respect to the fixed manifold press fixture.

8. The hydraulic manifold plug of claim 1, further comprising a manifold press fixture including a press body extending along the longitudinal axis, the manifold press fixture includes at least one positioning key extending away from a surface of the press body in a direction substantially parallel to the longitudinal axis.

9. The hydraulic manifold plug of claim 8, wherein the manifold press fixture is releasably fixed to a bracket relative to the plug body.

10. The hydraulic manifold plug of claim 8, wherein the at least one positioning key comprises a shape being one of a cylindrical shape, a square prism shape, a rectangular prism shape, a pentagonal prism shape, a hexagonal prism shape, and an octagonal prism shape.

11. A hydraulic manifold system comprising:
a manifold press fixture including a body defining a longitudinal axis, the manifold press fixture includes at least one positioning key extending away from a surface of the body in a direction substantially parallel to the longitudinal axis;
a plug extending along the longitudinal axis and defining a transverse axis, the plug comprising:
  a bottom surface defining at least one receiving hole configured to releasably receive the at least one positioning key; and
  an opening positioned opposite the bottom surface, the opening being at an angle with respect to the longitudinal axis and defining an inner surface; and
a hydraulic manifold defining a channel, the channel comprising a first channel portion and a second channel portion being at an angle with respect to the first channel portion, the hydraulic manifold defining a manifold port sized to receive the plug when the at least one positioning key is inserted in the at least one receiving hole;
wherein during assembly the manifold press fixture and the plug move along the longitudinal axis without rotation until positioned within the manifold port; and
wherein after assembly the manifold press fixture is released from the plug.

12. The hydraulic manifold system of claim 11, wherein the manifold press fixture is releasably fixed to a bracket relative to the hydraulic manifold.

13. The hydraulic manifold system of claim 11, wherein the at least one positioning key is a pin having a shape being one of a cylindrical shape, a square prism shape, a rectangular prism shape, a pentagonal prism shape, a hexagonal prism shape, an octagonal prism shape.

14. The hydraulic manifold system of claim 13, wherein the at least one receiving hole has a shape complimentary to the shape of the at least one positioning key.

15. The hydraulic manifold system of claim 11, wherein the inner surface of the opening defines a concave shape.

16. The hydraulic manifold system of claim 11, wherein the inner surface of the opening has a shape of a partial sphere.

17. The hydraulic manifold system of claim 11, wherein the inner surface of the opening has a shape of a partial ellipsoid.

18. The hydraulic manifold system of claim 11, wherein the first and second channel portions of the channel form a 90 degree angle with respect to one another.

19. The hydraulic manifold system of claim 11, wherein the hydraulic manifold moves along the transverse axis with respect to the manifold press fixture.

20. The hydraulic manifold system of claim 11, wherein when the plug is inserted into the manifold, the transverse axis of the plug is substantially parallel to a lateral axis defines by the first channel portion of the main channel.

* * * * *